Patented Aug. 23, 1927.

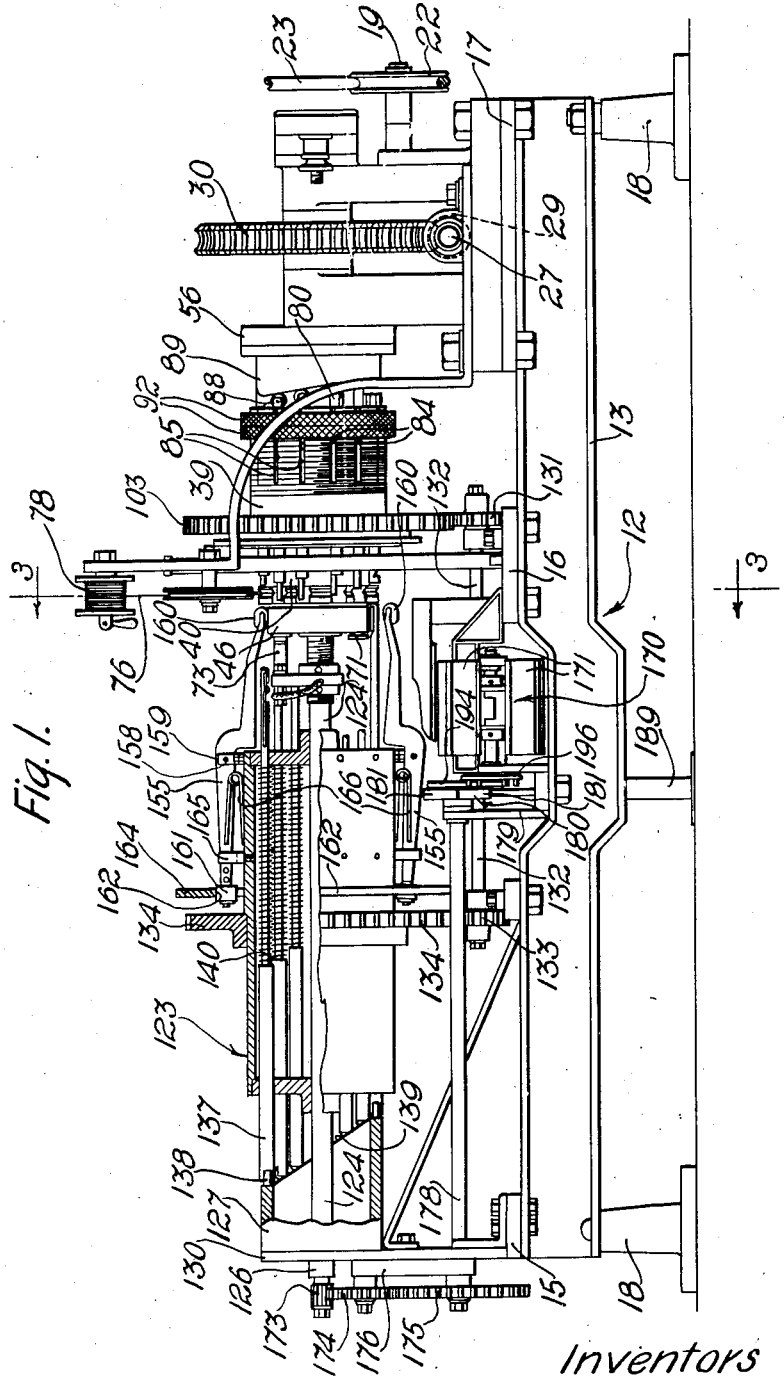

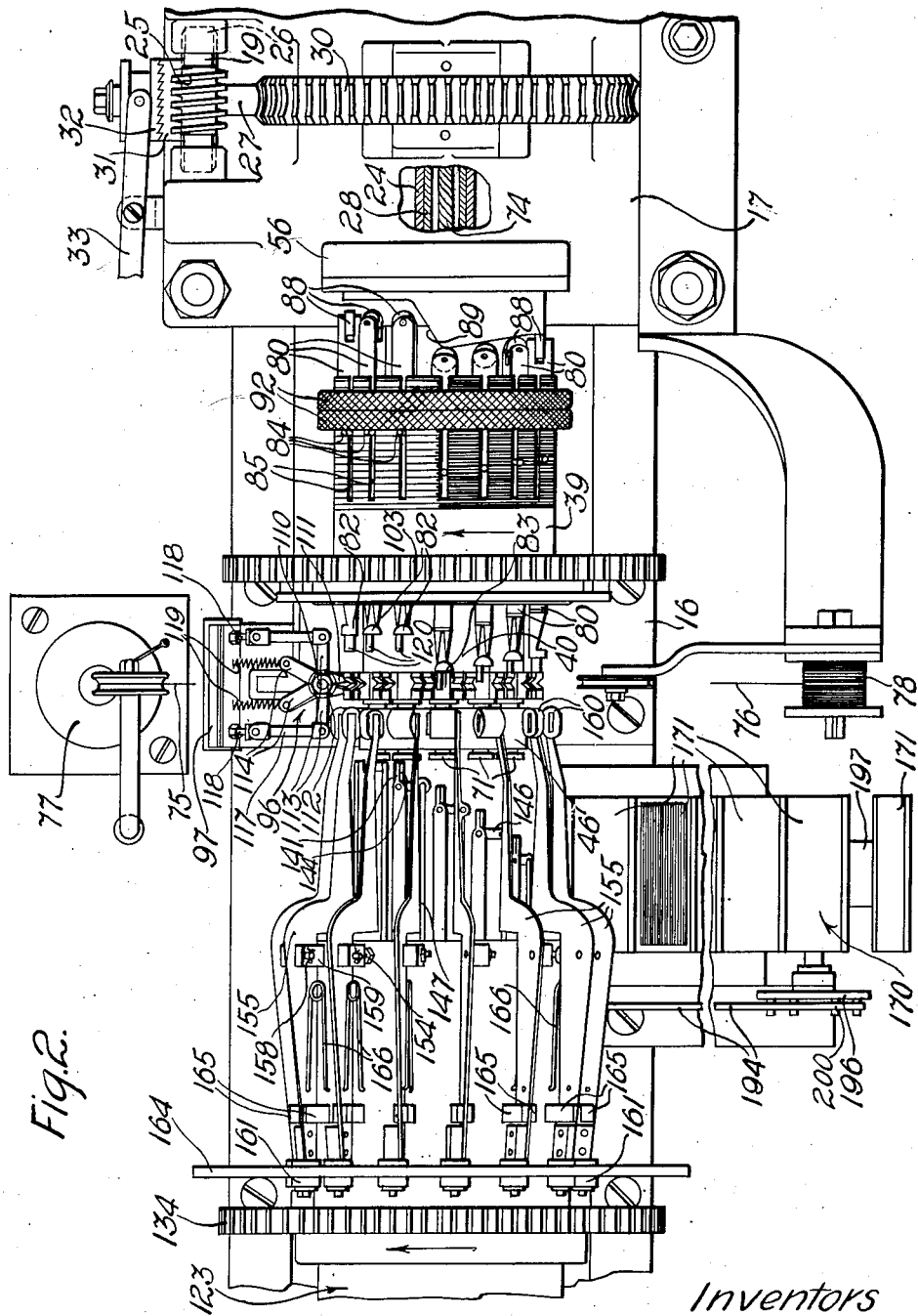

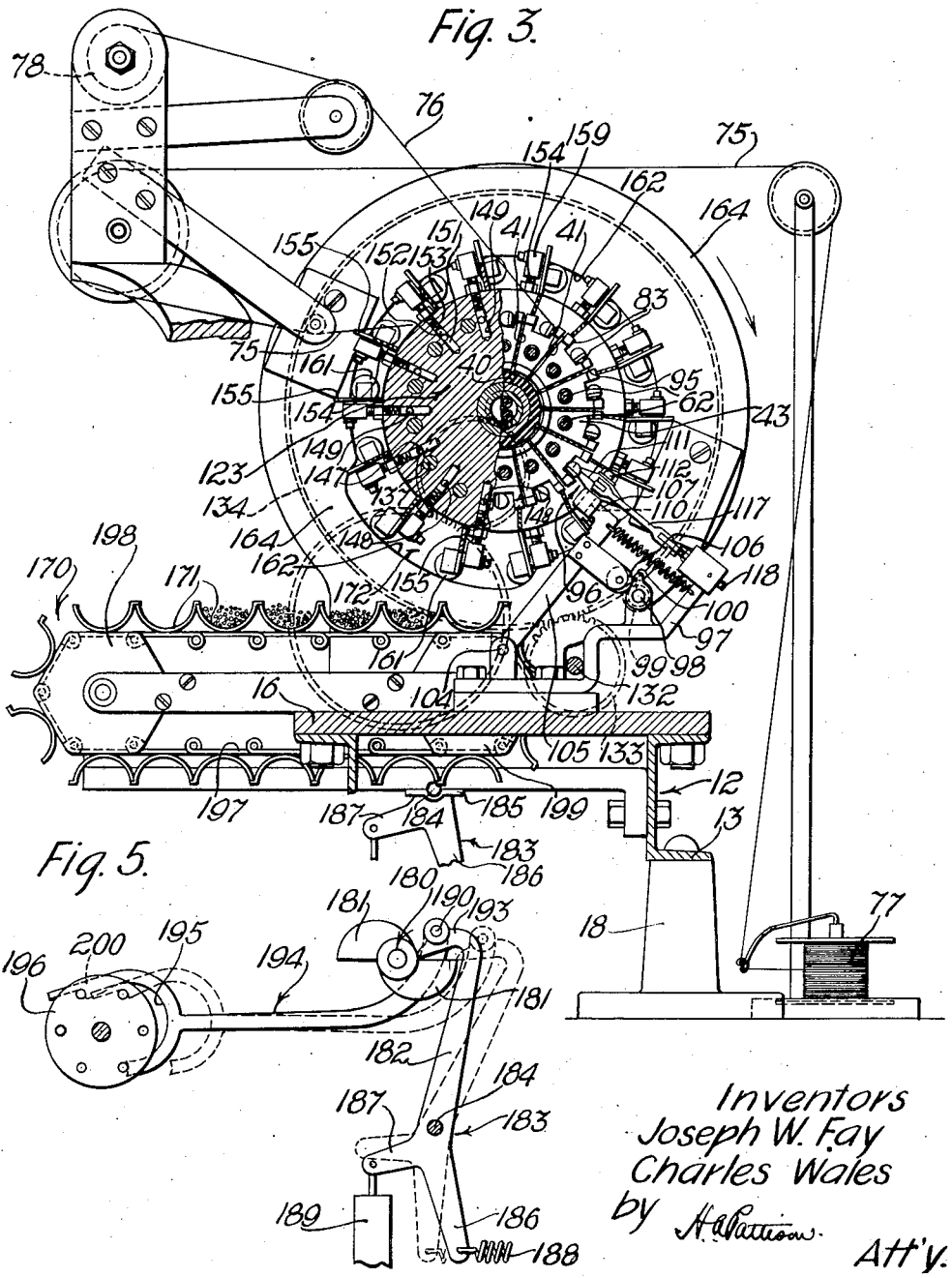

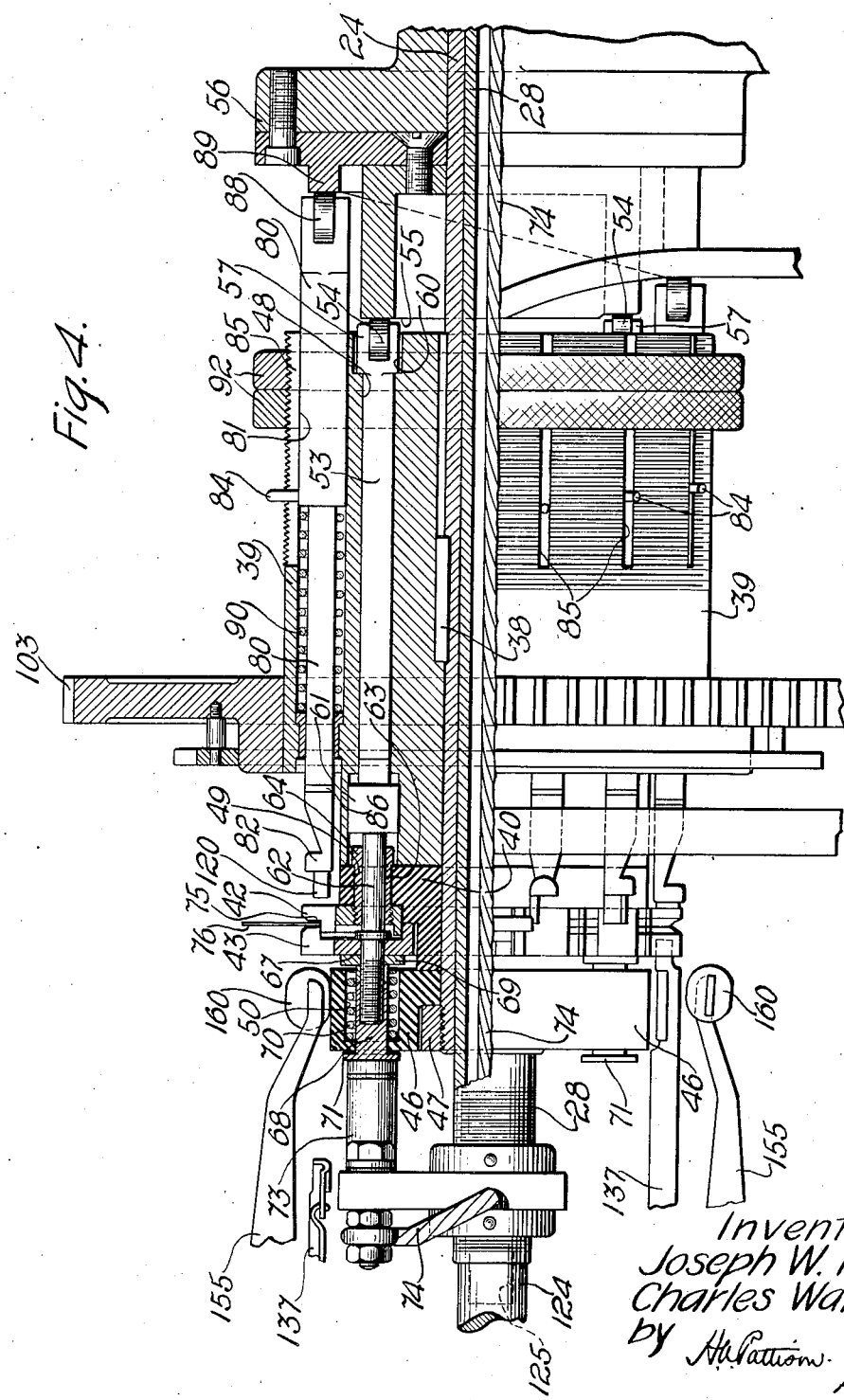

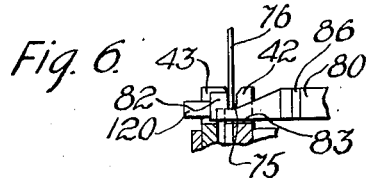
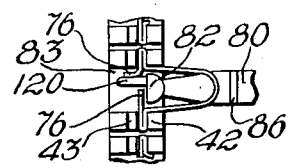
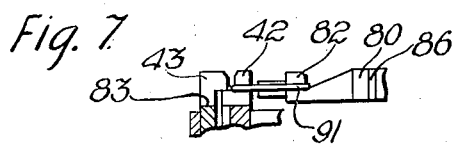
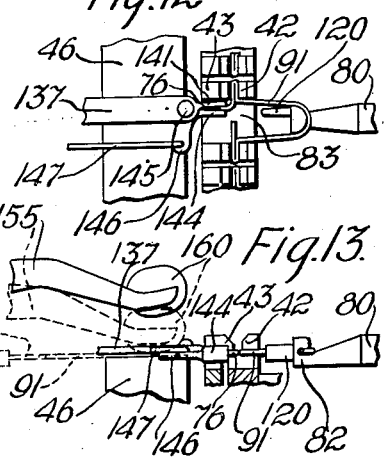
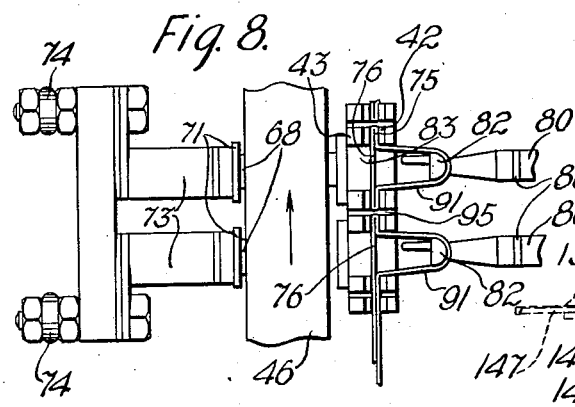
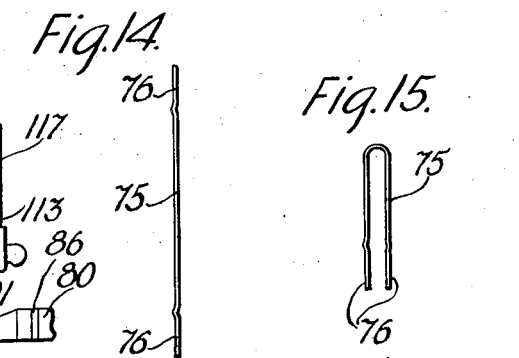
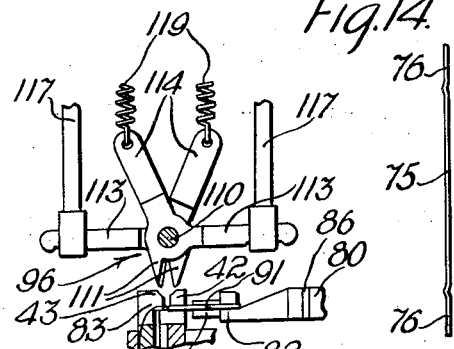
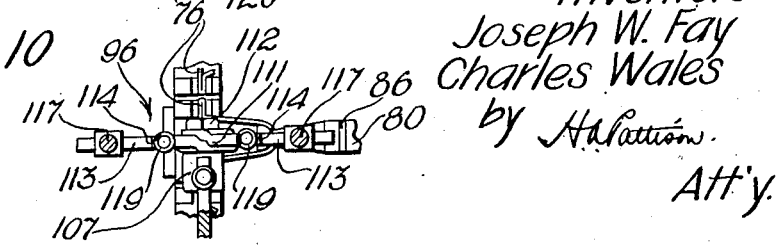

1,639,653

UNITED STATES PATENT OFFICE.

JOSEPH WILLIAM FAY, OF VILLA PARK, AND CHARLES WALES, OF LA GRANGE, ILLINOIS, ASSIGNORS TO WESTERN ELECTRIC COMPANY, INCORPORATED, OF NEW YORK, N. Y., A CORPORATION OF NEW YORK.

METHOD OF AND APPARATUS FOR WELDING METAL STRANDS.

Application filed August 22, 1925. Serial No. 51,752.

This invention relates to a method of and apparatus for welding metal strands, and more particularly to a method of and an apparatus for welding strands of precious or semi-precious metals.

In incandescent lamps it has been proposed to employ lead-in and mount wires of precious or semi-precious metals which are welded together as disclosed in the copending application of R. A. Price, Serial No. 713,461, filed May 15, 1924. It has also been proposed to weld such lead-in and mount wires in accordance with the method and by means of the apparatus disclosed and claimed in the copending application of J. W. Fay 725,044, filed July 9, 1924.

Objects of this invention are to provide an improved method of and an apparatus for rapidly welding, collecting and counting metal strands with a minimum of manual labor, supervision and waste of material.

The improved method in accordance with the features of this invention may be used to advantage in welding lead-in and mount wires of the above mentioned character, in which case lengths of lead-in wire stock are welded to the ends of, and extend across, open loops formed in lengths of mount wire stock, the lead-in wire lengths being subsequently sheared intermediate the sides of the loop and the assembly finally straightened. An apparatus embodying features of the invention and by means of which the method may be practiced comprises continuously operated means for withdrawing the two kinds of stock from continuous supplies, and means operating in sequence for forming loops of various sizes in the lengths of mount wire stock, for clamping the two lengths at separated points, connecting a source of electrical current to the clamping means for fusing and severing the lengths between the points and welding the adjacent lengths, shearing the lengths extending across the open ends of the loops, withdrawing the assemblies from between the jaws, and finally straightening, counting and collecting the completed assemblies. A plurality of sets of clamping, forming and straightening means are presented successively to the common current connecting, strand shearing, counting and collecting means.

Other objects and advantages of this invention will more fully appear from the following detailed description taken in connection with the accompanying drawings which illustrate one embodiment thereof, in an apparatus which may be used in performing the method and in which Fig. 1 is a side elevation partly in section of an apparatus embodying features of the invention and by means of which the several steps comprising the improved method may be practiced;

Fig. 2 is an enlarged fragmentary plan view thereof;

Fig. 3 is an enlarged vertical section taken on the line 3—3 of Fig. 1;

Fig. 4 is an enlarged vertical longitudinal sectional view partly in elevation through a portion of Fig. 2;

Fig. 5 is a detail side elevation of the means for operating the mechanism for collecting, counting and conveying the completed assemblies;

Figs. 6 and 7 are fragmentary detail views showing the position of the length gauging member at the beginning and ending, respectively, of its loop forming movement;

Fig. 8 is a fragmentary detail view showing the position of the clamping and welding jaws and circuit closing means during the fusing and welding operation;

Figs. 9 and 10 are fragmentary detail views of the means for mechanically severing the lead-in wire section intermediate its ends;

Fig. 11 is a fragmentary detail view of the means for forming one end of the lead-in wire section at an angle in preparation for the removal of the assembly from the clamping jaws;

Figs. 12 and 13 are fragmentary detail views of the means for removing and straightening the assemblies;

Fig. 14 shows a completed assembly of the lead-in and mount wires as delivered from the apparatus, and Fig. 15 shows the form imparted to the assembly for association with the stem of a lamp.

Referring to the drawings, wherein like reference numerals designate similar parts throughout the several figures and more particularly to Figs. 1 and 3 of the drawings, the numeral 12 indicates a suitable base or frame upon which the entire apparatus is mounted, comprising a pair of spaced channel members 13 interconnected by a plurality of transverse plates 15, 16 and 17 secured to the upper surfaces thereof, the frame at each corner resting upon standards 18, 18 suitably secured to the lower surfaces of the channel members. Suitably journaled upon the plate 17 is a driving shaft 19 carrying a pulley 22 which in the operation of the apparatus is connected through a belt 23 to any suitable main driving element (not shown). The shaft 19 is operatively connected to a parallelly disposed hollow shaft 24 (Fig. 4) by a worm 25 (Fig. 2) fixed to the shaft 19, which worm meshes with a worm gear 26 (Fig. 2 dotted outline) freely rotatable upon a suitably journaled shaft 27 positioned below the axes of the shafts 19 and 24 and extending at right angles thereto. The shaft 24 is journaled upon a stationary hollow shaft 28 (Fig. 4) fixed at one end to the transverse plate 17. The shaft 27 carries at its opposite end a worm 29 (Fig. 1 dotted outline) which meshes with a worm gear 30 fixed to the shaft 24. The worm gear 26 may be connected to and disconnected from the shaft 27 by operating a suitable jaw clutch of any well known type comprising a jaw 31 rotatable with the gear 26 and a jaw 32 keyed to rotate with, but reciprocably mounted upon the shaft 27. The jaw 32 is adapted to be shifted to engage the jaw 31 as shown in Fig. 2 by operating a lever 33 by suitable mechanism (not shown).

Rigidly secured to rotate with the shaft 24, as indicated at 38, is a metallic disk 39 (Figs. 1, 2 and 4) abutting at one end a fiber disk 40 also secured to rotate with the shaft 24 and provided with a plurality of radially extending compartments 41 (Fig. 3), each of which carries a wire clamping and welding means comprising a fixed jaw 42 (Fig. 4) suitably secured therein and a movable jaw 43 reciprocably mounted therein. Each set of jaws 42 and 43 carried within one compartment is electrically insulated from the pairs of jaws mounted in adjacent compartments. Clamped against the fiber disk 40 is a second fiber disk 46 which in the operation of the apparatus functions as distributor block for the welding current to the clamping and welding jaws 42 and 43. The fiber disks 40 and 46 are prevented from longitudinal movement upon the shaft 24 and secured against the disk 39 by a lock nut 47 screw threaded upon the end of the shaft 24. The disks 39, 40 and 46 are each provided with a plurality of aligned longitudinally extending axially arranged openings 48, 49 and 50 respectively and the clamping jaws 42 and 43 are also provided with openings which align with the aforementioned openings. Slidably mounted in each of the openings 48 is a clamp jaw operating rod 53 (Fig. 4) equipped, at its right hand end, with an anti-friction roller 54 adapted to ride upon a cam 55 rigidly secured to an upright plate 56 integral with the plate 17. The rods 53 are held against rotation about their own axes by mounting the rectangular shaped bearing heads 57 for the rollers 54 within an annular channel 60 formed in the right hand end face of the disk 39. The left hand end face of each of the rods 53 abuts one end of a shouldered fiber block 61 reciprocably mounted in an enlarged portion of the opening 48, the opposite end of the block 61 abutting a pin 62 reciprocably mounted in a metallic bushing 63 fixed within the opening 49 of the disk 40. One end of the bushing 63 is screw threaded into the fixed jaw 42 to secure the same in position within its compartment 41 while the opposite end is provided with a head 64 which is clamped against the end face of the disk 40. Sufficient clearance is provided between the peripheral surface of the head 64 and the wall of the enlarged portion of the opening 48 to prevent electrical contact therebetween. The pin 62 is provided with a flange or shouldered portion 67 intermediate its ends which engages the movable jaw 43 and at its left hand end the pin is screw threaded into a contact member 68 reciprocably mounted in the opening 50 of the disk 46. A disk 69 is mounted upon the pin 62 between the right hand end of the contact member 68 and the jaw 43. Mounted in the opening 50 and upon the member 68 between the disk 69 and inside end wall of the opening 50 is a compression spring 70. The left hand end of the contact member 68 is provided with a head 71 adapted, in the operation of the apparatus, to contact with a pair of electrical current carrying brushes 73, suitably supported upon and insulated from, the stationary shaft 28 (Figs. 4 and 8). The hollow shaft 28 serves as a conduit for carrying a pair of wires 74 (Figs. 3 and 4) which serve to connect the brushes 73 with a suitable source of current supply (not shown). It will be readily apparent, that as the disk 39 rotates, the rollers 54 riding upon the stationary cam 55 will be moved to the left at predetermined points in the rotation of the disk 39. Thus the movable jaw 43 will be moved to the left against the action of the spring 70 to provide a clearance between the engaging faces of the jaw members 42 and 43 for the entrance of a pair of wires 75 and 76 (Figs. 2 and 3). Also as the roller 54 rides down the cam 55 that the spring will move the jaw 43 to the right and thereby cause the wires to be clamped in position. The wires 75 and 76 in the operation of the apparatus are drawn from suitable sources of supply indicated at 77 and 78 respectively (Fig. 3) over suitable guide rollers and into alignment with the faces of the clamping jaws 42 and 43. It will be noted, referring to Fig. 3, that due to the arrangement of the guide pulleys the wire 75 moves into position between the jaws just before the wire 76 is positioned therebetween and alongside the wire 75, the assembled position of the wires in the jaws is clearly indicated in Fig. 4. The apparatus in the embodiment illustrated is so arranged that the sections obtained from the wire 75 will be of greater lengths than the sections obtained from the wire 76, the wires 75 and 76 being employed to form the mount wires and the lead-in wires respectively of the electric lamps of the aforementioned type. It is, of course, understood that the lead-in wires of electric lamps are made as short as possible because of the comparatively high cost of the material from which they are manufactured.

*Length gauging mechanism.*

The length of the sections formed from the wire 75 are gauged by mechanism comprising a plurality of horizontally disposed pins 80 reciprocably mounted in openings 81 formed in the disk 39 outside of the pins 53 and provided at their left hand end with a hook portion 82 adapted in the operation of the apparatus to be projected to the left and into bifurcations 83 formed in the jaws 42 and 43 as clearly shown in Figs. 3, 6 and 7 and forward of the wire 75 which at this time has not been clamped between the bifurcations 83. Each hook portion 82 is electrically insulated from its supporting pin 80 by a spacing disk 86 (Fig. 4) which may be composed of rubber or any suitable insulating material. The purpose of insulating the pin 80 from the portion 82 will be made apparent as the description progresses. Each pin 80 is held against rotation about its own axis by means of a pin 84 projecting therefrom and riding in one of a plurality of slots 85 formed in the disk 39. The right hand ends of the pins 80 are provided with anti-friction rollers 88 adapted to ride upon a cam 89 rigidly secured to the upright plate 56 formed upon the plate 17. A helical compression spring 90 is provided for each pin 80, the spring 90 being adapted to hold the anti-friction roller 88 in engagement with the cam 89 or at the extreme end of its movement to the right. Upon the pin 80 moving to the right and forward of the wire 75, due to the roller 88 riding upon the cam 89 (Fig. 2) as the disk 39 is rotated clockwise, the wire 75 is hooked by the portion 82. In the continued rotation of the disk 39 the roller 88 dropping off the high point of the cam 89 allows the compression spring 90 to move the pin 80 to the right and consequently draw the wire 75 with it thus forming a loop 91 (Figs. 6, 7 and 8), the wire bending about the inside walls of the bifurcations 83. The depth of the loop 91 and thus the length of the sections formed upon the wire 75 is predetermined by adjusting a pair of lock nuts 92 screw threaded upon the disk 39 against which the pin 84 engages as it moves to the right under the action of the spring 90, as clearly shown in Fig. 4. It will be readily apparent that the nearer the lock nuts 92 are positioned to the right hand end of the disk 39 the longer the sections formed from the wire 75 will be and vice versa.

*Welding and severing mechanism.*

In the operation of the apparatus, the disk 39 will in rotating cause an engagement of a pair of heads 71 of the contact members 68 carried therein with the stationary brushes 74 whereupon an electric current of sufficient amplitude will flow through the bridged wires 75 and 76 clamped between adjacent pairs of the jaws 42 and 43 to fuse the end portions of the sections to each other and to sever the sections adapted to form one assembly from the sections adapted to form the following assembly. Due to the disk 86 insulating the hook portion 82 from its supporting pin 80 the current will now flow from the wires to the frame of the machine through the pin 80. The gap indicated at 95 (Figs. 3 and 8) across which the wires are bridged and at which point the fusing takes place may be and preferably is a trifle less than one-thirty-second of an inch and consequently a very small amount of the wire is wasted in the fusing and severing operation.

*Shearing mechanism.*

In the continued rotation of the disk 39 the fused aligned sections of the wires 75 and 76 are advanced to a point where the section obtained from the wire 76 is severed intermediate its ends which were just previously fused to a looped section of the wire 75. The wire 76 is severed by a pair of shears indicated at 96 (Figs. 2, 3, 9 and 10) which are caused to operate in proper sequence in the following manner. Journaled in a bracket 97 (Fig. 3) mounted upon the plate 16 is a shaft 98 having fixed thereto a pinion 99 and a cam wheel 100, the pinion 99 being in mesh with a gear 103 suitably secured to the rotatable disk 39. Pivotally mounted as indicated at 104 upon the bracket 97 is a lever 105 carrying an anti-friction roller 106 adapted to ride upon the cam wheel 100. The lever 105 is provided with a right angled portion 107 comprising a head adapted to support a shaft 110 upon which is pivotally mounted a pair of shear blades 111, the blades being retained against longitudinal movement thereon by a nut 112 screw threaded upon the shaft 110. The blades 111 are each provided with two arms 113 and 114 (Fig. 10), the arms 113 each being pivotally connected to one end of a link 117 (Fig. 2), the opposite end of the links each being pivotally connected to a pin 118 adjustably mounted upon the bracket 97. Helical tension springs 119 are secured at one end to each of the arms 114, the opposite ends of the springs 119 being fixed to the bracket 97. The springs serve to move the blades 111 into their open position as shown in Figs. 9 and 10, and also cause the roller 106 to be held in engagement with the cam wheel 100. It will be readily apparent that as the disk 39 rotates in a clockwise direction the gear 103 carried thereby will cause the pinion 99 to rotate counter-clockwise, thereby rotating the cam 100 and causing the lever 105 to turn about its pivot 104 in a similar direction. As the lever turns about its pivot 104 the shear blades 111 are consequently moved bodily toward the axis of the disk 39 and into the opening between the bifurcations 83 of the advancing jaws 42 and 43 and due to the connection between the links 117 and the arms 114 of the shear blades, the blades are closed. At this instant the section of the wire 76 to be severed has been advanced to a point where it is positioned intermediate the opened advancing shear blades 111 which are closed upon the wire 76, thereby severing it intermediate its ends. In the continued advancement of the disk 39 the roller 106 will ride down the cam whereupon the blades 111 will be moved bodily back to the position shown in Figs. 2 and 3 and during this movement the springs 119 and links 117 connected to the arms 114 and 113 respectively serve to open the blades. This completes the assembly of the lead-in and mount wires which assembly is now ready to be removed from the jaws 42 and 43 and in so doing is pulled straight as shown in Fig. 14.

*Mechanism for preparing assembly for removal.*

The next operation in the continued advance of the disk 39 consists in projecting to the left, as viewed in Fig. 11, one of the free ends of the wire 76 just severed by the shears 111, thus forming a substantially right angle bend in the wire with the bent portion disposed parallel to the axis of the disk 39. This is accomplished by providing the extreme left hand end face of the hook portion 82 of the pin 80 with an offset projecting lug 120 (Figs. 4 and 11), which will engage only one of the ends of the section of wire 76 when the pin 80 is caused to move to the left by the cam 89 in proper sequence as the disk 39 continues to advance.

*Mechanism for removing, straightening and assembling.*

In the further movement of the disks and drum the assembled wires are first removed from between the jaws 42 and 43 and thereafter straightened as shown in Fig. 14. Upon the left hand end of the frame 12 and in axial alignment with the disks 39, 40 and 46 is mounted a rotatable drum 123 (Figs. 1, 2 and 3). The drum 123 is fixed to rotate with a shaft 124 suitably journaled at its right hand end as indicated at 125 (Fig. 4) upon the stationary shaft 28 and at its opposite end in a bearing sleeve 126 secured to a stationary cup shaped member 127 (Fig. 1) mounted upon an upright plate 130 fixed to the plate 15 and in axial alignment with the drum 123. The drum 123 is caused to rotate simultaneously and in unison with the disks 39, 40 and 46 through a gear drive comprising a pinion 131 (Fig. 1) meshing with the gear 103, the pinion 131 being mounted upon one end of a suitably journaled shaft 132 the opposite end of which carries a pinion 133 meshing with a gear 134 secured to the drum 123. The diameter of the pinions 131 and 133 and gears 103 and 134 respectively are the same, therefore it will be apparent that as the disk 39 is advanced the drum 123 will be advanced simultaneously in the same direction and at the same rate of speed.

Reciprocably mounted in the drum 123 and in substantial axial alignment with the pins 80 similarly mounted in the disk 39 are a plurality of rods 137 (Figs. 1, 12 and 13) each carrying at one end an anti-friction roller 138 which is adapted to ride upon a cam 139 formed upon the right hand end face of the cup shaped member 127 (Fig. 1). Carried upon each rod 137 between a shoulder formed thereon and the inside face of the right hand end of the drum 123 is a helical compression spring 140 adapted to hold the anti-friction roller 138 in engagement with the cam 139.

The right hand end of the rod 137 is shaped to form a gripping finger as indicated at 141 (Figs. 12 and 13) and associated therewith is a cooperating gripping finger 144 which is pivotally mounted upon the rod 137 as indicated at 145. Integral with the finger 144 is an arm 146 extending at right angles thereto and attached to the end thereof is a reciprocably mounted link rod 147 which extends to the left and through suitable openings 148 (Fig. 3) provided in the right hand end wall of the drum 123.

The length of the rod 147 is such that when the roller 138 is riding upon the high point of the cam 139 the left hand end of the rod 147 will not disengage the right hand end wall of the drum 123. Referring to Fig. 3, the numeral 149 indicates a plurality of radially extending depressions, one for each link rod 147, formed in the right hand end wall of the drum 123 and which are disposed at right angles with the openings 148. Mounted within each depression 149 and upon opposite sides of the rod 147 which is reciprocably movable at right angles therethrough are fiber blocks 151 and 152. A helical compression spring 153 is positioned within each depression 149 between the fiber block 152 and the end of a pin 154 screw threaded into the depression 149. It will be readily seen that the link rod 147 is frictionally retarded from longitudinal movement to the right or left whenever the rod 137 is reciprocated. During the rotation of the drum 123 which is in unison with the advancement of the disk 39 the rods 137 are projected in sequence toward the right against the action of the spring 140 and into the space between the bifurcations 83 of the jaws 42 and 43. In thus moving, the finger 144 is swung clockwise about its pivot point 145 and away from the finger 141 due to the friction incurred by the link rod 147 in moving between the fiber blocks 151 and 152 as will be readily understood. This position of the fingers is clearly shown in Figs. 12 and 13 and it will be noted that the free end of the section of wire 76 which has been turned at right angles, lies between the engaging surfaces of the fingers 141 and 144 ready to be gripped therebetween. In the further advancement of the drum 123 the roller 138 rides down the cam 139 and the spring 140 functions to move the rod 137 to the left whereupon due to the friction set up between the blocks 151 and 152 and the link rod 147 the finger 144 is swung about its pivot 145 counter-clockwise, thereby gripping the free end of the wire 76 between it and the finger 141. The instant the fingers 141 and 144 have securely gripped the wire 76 the movable jaw 43 is moved to the left by the jaw operating rod 53 caused by the roller 54 riding down the cam 55, thus freeing the assembly of the wires 75 and 76 from the clamping and welding jaws 42 and 43.

The wire straightening mechanism comprises a plurality of pivotal lever like members 155 one associated with each pair of gripping fingers and pivoted as indicated at 158 to a block 159 suitably attached to the outside end of the pin 154 (Figs. 1 and 2). The right hand end of the member 155 supports a pad of felt or other suitable material, indicated at 160, which is in radial alignment with the fingers 141 and 144 and between the pad and the peripheral surface of the disk 46 the assembled wires 75 and 76 are pulled by the gripping fingers 141 and 144 (Fig. 12). The left hand end of the member 155 carries an anti-friction roller 161 adapted to ride upon a cam surface 162 formed upon a stationary plate 164 supported from the frame 12. Suitable guides are indicated at 165 carried upon the drum 123 for preventing a movement of the members 155 at right angles to their movement about the pivot 158, during the rotation of the member around the cam surface 162. Associated with each member 155 is a spring 166 adapted to hold the roller 161 in engagement with the cam surface 162. In the operation of the apparatus and at the time the gripping fingers 141 and 144 are being advanced to the right to grip the wire 76 as hereinbefore described, the pad 160 is in the position indicated in full outline in Fig. 13 and later assumes the position indicated in dotted outline in the same figure. After the fingers 141 and 144 have gripped the assembled wires 75 and 76 and moved therewith to the left to a point where the extreme end of the fingers have cleared the left hand edge of the disk 46 the cam 162 permits the member 155 to be rocked clockwise about its pivot 158 due to the action of the spring 166. This movement of the member 155 instantaneously moves the pad 160 downwardly against the assembled wires 75 and 76 which are quite fine and which may be easily straightened. The pad 160 is thus, with the aid of spring 166, held firmly in engagement with the assembled wires, thereby subjecting them to tension as they are drawn across the peripheral surface of the disk 46. As a result of this operation the wires will be straightened in the form shown in Fig. 14.

*Counting and conveying mechanism.*

The straightened assembled wires are next released from the gripping fingers 141 and 144 and drop onto a conveying mechanism which is intermittently moved when fifty assemblies have been released. Positioned intermediate the drum 123 and the disk 46 and below the gripping fingers 141 and 144 mounted upon the drum 123 is an intermittently operated endless conveyor 170 (Figs. 1 and 2) provided with a plurality of buckets 171 into which the assembled wires 75 and 76 drop when released from the gripping fingers at a predetermined point in the continued advance of the drum 123 upon completion of the straightening operation. The point of release of the wire assemblies is indicated by the numeral 172 (Fig. 3). In the present embodiment of this invention the operating mechanism for the conveyor 170 is so designed that upon fifty of the wire assemblies being released at the point 172 and dropping into the bucket 171 positioned directly therebelow, the conveyor is operated toward the left, as viewed in Fig. 3, to position an empty bucket 171 below the releasing point 172 for the wire assemblies. This intermittent movement upon the loading of fifty assemblies in one of the buckets of the conveyor is accomplished in the following manner. Secured to the left hand end of the shaft 124 (Fig. 1) which shaft receives its motion from the drum 123 as hereinbefore described is a pinion gear meshing with an idler gear 174 in turn meshing with a gear 175. The idler gear is journaled upon a bracket 176 mounted upon the plate 130 and the gear 175 is fixed to a shaft 178 journaled at its left hand end in the bracket 176 and at its opposite end in a bracket 179. The shaft 178 carries upon its right hand end a cam wheel 180 provided with two cam faces 181 spaced 180° apart upon its periphery (Fig. 5) which faces are arranged to engage a long upper arm 182 of a bell crank lever 183 pivotally supported as indicated at 184 upon a bracket 185 mounted upon the frame 12 (Fig. 3). The lower end of the lever 183 is provided with two arms 186 and 187 connected to a tension spring 188 and a dash pot 189, respectively. Pivotally connected, as indicated at 190, to an angularly disposed portion 193 at the upper end of the arm 182 is an escapement lever 194, one end of the arm 182 being bifurcated as indicated at 195 and adapted to operatively engage a pin wheel 196. The conveyor 170 comprises an endless link chain 197 which is supported upon sprocket wheels 198 and 199, the shafts for which are suitably supported upon the frame 12, the pin wheel 196 being fixed to the shaft carrying the sprocket wheel 198. Each link of the chain 197 supports upon its outer face a semi-circular shaped bucket 171. Referring to Figs. 3 and 5 it will readily be apparent that in the movement of the cam wheel 180 in a clockwise direction the bell crank lever 183 will be rocked about its pivot 184 in a similar direction, due to the engagement of the uppermost cam face 181 (Fig. 5) with the end of the angularly disposed portion 193 of the lever 183. In Fig. 5 the cam wheel 180 and levers 183 and 194 are shown in full outline in the position they assume immediately after a movement of the conveyor. During the movement of the lever 183 just described the escapement lever 194 will be moved slowly toward the right. It being connected to the lever 183 as previously described, until an arm 200 of the bifurcated end 195 engages another pin in the pin wheel 196 at which time the levers 183 and 194 are in the position indicated in dotted outline in Fig. 5. Upon the cam face 181 reaching a position where it disengages the end of the portion 193 of the lever 183, which position is indicated by the position of the lower cam face 181 (Fig. 5) the lever 183 will be rocked quickly in a counter-clockwise direction due to the energy stored in the spring 188 during the clockwise movement of the lever 183 to the position indicated in full outline. This latter movement of the lever 183 causes the lever 194 to move toward the left and due to the engagement of the arm 200 thereof with the pin upon the pin wheel 196, the conveyor will move the required distance to position an empty bucket 171 under the releasing point 172 for the wire assemblies. The gear ratio between the pinion 173 fixed to the shaft 124 and the idler gear 174 and gear 175 is such that the lever 194 will be actuated toward the right (Fig. 5) upon the depositing of fifty assemblies in one of the buckets 171. The dash pot 189 which may be of any suitable construction serves to prevent too sudden a movement of the conveyor. As the conveyor 170 steps the buckets 171 toward the left (Fig. 3) each containing fifty wire assemblies, an operator removes and wraps them up or may put them into a suitable container.

The operation of this apparatus is as follows:

Assuming that the wires 75 and 76 have been threaded from the supply sources 77 and 78, respectively, over their respective guide rollers and properly clamped between the jaws 42 and 43, power is applied to the hollow shaft 24 by causing the engagement of the jaw clutch as indicated on Fig. 2. The apparatus is thereby set in operation and as the disks 39, 40 and 46 and drum 123 rotate continuously and in unison in a clockwise direction, as viewed in Fig. 3, the wires 75 and 76 will be continuously placed in parallel positions between the clamping and welding jaws 42 and 43 as shown in Figs. 6, 7 and 8. Before the wires 75 and 76 are clamped between the jaws 42 and 43, the loop 91 in the wire 75 is first formed by the operation of one of the pins 80 which is first moved to the left from the position shown in Fig. 4 and before the wire 75 is entered between the bifurcations 83 to the position shown in Fig. 6 with the hook portion 82 to the left of the wire 75. It is assumed that before setting the apparatus in operation the lock nuts 92 have been adjusted upon the disk 39 as hereinbefore described to form a predetermined depth of the loop 91. In the continued rotation of the disks and drum the pin 80 is moved to the right, and immediately thereafter due to the advancing disks 39 and 40 the wire 75 is entered between the bifurcations 83 and in front of the hook portion 82 (Fig. 6), thereby forming the loop 91 as clearly shown in Figs. 7 and 8 in the wire 75 which at this instant is unclamped. The next step in the continued advance of the disks and drum causes the movable jaw 43 to be moved to the right to clamp the aligned sections of the wires 75 and 76 against the stationary jaw 42 as clearly illustrated in Fig. 8. Upon completion of the clamping operation a pair of the heads 71 of the contact members 68 are advanced into engagement with the stationary brushes 74 whereupon an electric current will flow across the gap 95 between adjacent insulated pairs of jaws positioned at a point intermediate the brushes 74 and cause the end portions at one side of the clamped sections of the wires to be fused to each other and a severing of the sections of one assembly from the sections of the following assembly. Due to the insulated pin 80 the current will not flow from the wires to the frame of the machine. The section of the wire 76 which is now fused at both ends to the ends of the looped section of wire 75 which sections of wire are still clamped between the jaws 42 and 43 and spanning the bifurcation 83 of the jaws is now advanced to a point where it is severed intermediate its ends by the shears 96 in the manner hereinbefore described (Figs. 2, 3, 9 and 10). The disks and drum continuing to advance cause the pin 80 to be projected toward the left whereupon the offset lug 120 thereof will engage one of the severed ends of the section of wire 76 and form a substantially right angle bend therein as clearly shown in Fig. 11. As the disks continue to advance the drum 123 is also advanced as hereinbefore described which causes the rod 137 to move toward the left and the gripping fingers 141 and 144 to separate during such movement so that at the end of the movement of the rod 137 the free end of the section of wire 76 which has just previously been formed at right angles with respect to the other portion thereof lies between the engaging surfaces of the gripping fingers as clearly shown in Figs. 12 and 13. The disks and drum still advancing causes the rod 137 to move toward the left to its original position and during such movement the fingers 141 and 144 are operated to grip the end of the section of wire 176 therebetween and remove the assembled wires 175 and 176 from between the gripping jaws 42 and 43 which at the proper instant in the cycle of operations have been operated to release their hold upon the assembly. As the assembly of wires is moved toward the left the member 155 is caused to swing the padded end 160 thereof toward the peripheral surface of the disk 46, across which the fingers are moving, and into engagement with the assembled wires just as the fingers clear the left hand edge of the disk 46, thereby straightening the assembly as the fingers continue to pull it between the periphery of the disk 46 and the pad 160. Finally the straightened wire assembly is advanced to the releasing point 172 whereupon the fingers 141 and 144 are operated to release the assembly which falls into the bucket 171 positioned directly therebelow and when fifty assemblies are positioned in the bucket the conveyor 170 is operated in the manner hereinbefore described to move an empty bucket into position for loading. The operator removes the bunch of fifty wire assemblies as the conveyor is advanced toward the left (Fig. 3) and ties them up into bundles or otherwise contains them.

The completed assemblies, when discharged from the machine, appear as is shown in Fig. 14 wherein the reference character 203 designates the section adapted to form two mount wires, the lead-in wires being indicated at 204. The assembly is finally formed as shown in Fig. 15, when it is secured to the stem of the electric lamp, the mount wire section being severed after the assembly has been secured to the stem.

What is claimed is:

1. The method of welding metal strands, which consists in welding a length of metal strand to the ends of and extending across an open loop in another length of metal strand, and then shearing the first-mentioned length of strand intermediate the sides of the loop.

2. The method of welding metal strands, which consists in welding a length of metal strand to the ends of and extending across an open loop in another length of metal strand, shearing the first-mentioned length of strand intermediate the sides of the loop, and then straightening the welded lengths.

3. In an apparatus for welding metal strands, means for successively welding metal strands having an intermediate portion welded to end portions, means for collecting and counting said welded strands, means for depositing the welded strands in said collecting means, and means for operating said welding, depositing, collecting and counting means in timed relation to each other.

4. In an apparatus for welding metal strands, means for welding a length of metal strand to and extending across an open loop in another length of metal strand, and means for shearing the first-mentioned length.

5. In an apparatus for welding metal strands, means for welding a length of metal strand to an intermediate looped length of metal strand, means for shearing a portion of the assembled lengths, and means for straightening the welded lengths.

6. In an apparatus for welding metal strands, jaws for clamping a plurality of lengths of metal strand in adjacent relationship and at separated points, said jaws being electrically insulated from each other, and means for connecting the jaws to a source of electrical current to cause a flow of current therebetween to fuse and thereby sever the lengths between the separated points and weld the adjacent lengths.

7. In an apparatus for welding metal strands, means for supporting a plurality of lengths of metal strand in adjacent relationship, means for forming an open loop in one of the supported lengths, the ends thereof adjacent to another of the positioned lengths, jaws for clamping the adjacent portions of the lengths at separated points therealong, said jaws being electrically insulated from each other, means for connecting the jaws to a source of electrical current to cause a flow of current therebetween to fuse and thereby sever the lengths between the separated points to weld the adjacent lengths, means for shearing the length extending across the open end of the loop intermediate the sides thereof, and means for straightening the welded lengths.

8. In an apparatus for welding metal strands, means for supporting a plurality of lengths of metal strand in adjacent relationship, means for forming an open loop in one of the supported lengths, the ends thereof adjacent to another of the supported lengths, jaws for clamping the adjacent portions of the lengths at separated points therealong, said jaws being electrically insulated from each other, means for connecting the jaws to a source of electrical current to cause a flow of current therebetween to fuse and thereby sever the lengths between the separated points and weld the adjacent lengths, means for shearing the length across the open end of the loop intermediate the sides thereof, means designed to receive straight strands, and means for straightening and depositing the welded strands in said receiving means.

9. In an apparatus for welding metal strands means for welding lengths of metal strand to the ends of an intermediate length of metal strand, pressing means, and means for gripping the welded lengths and subjecting them to the pressing means to change the form thereof.

10. In an apparatus for welding metal strands, means for forming a loop in a length of metal strand, means for welding the looped strand to another length of metal strand, and adjustable means for controlling the forming means for varying the length of the loop formed thereby.

11. In an apparatus for welding metal strands, a strand shearing means, a carrier, a plurality of means mounted thereon for welding and supporting lengths of metal strand, and means for causing a relative movement between the carrier and the shearing means to successively present the welding and supporting means to, and cause the actuation of, the shearing means to shear one of the welded lengths.

12. In an apparatus for welding metal strands, means for gripping the metal strands at separated points therealong, means engaging one of the strands for forming a loop thereof, means for adjusting said engaging means to vary the size of the loop, mechanism for welding the metal strands at the engaged points, and means for severing one of the strands at a point intermediate the welds.

13. In an apparatus for welding metal strands, two sets of jaws for gripping the metal strands at separated points therealong, means engaging one of the strands between the jaws for forming a loop thereof, mechanism for applying welding current to each of said sets of jaws for welding the engaged strands, means for severing one of the strands, and means for gripping a free end of a welded strand for withdrawing it.

14. In an apparatus for welding metal strands, two sets of jaws for gripping the metal strands at separated points therealong, means engaging one of the strands between the jaws for forming a loop thereof, mechanism for applying welding current to each of said sets of jaws for welding the engaged strands, means for severing one of the strands, means for gripping a free end of a welded strand for withdrawing it, and means effective for operating said means in timed relation whereby the recited operations are performed successively.

In witness whereof, we hereunto subscribe our names this 11th day of August A. D., 1925.

JOSEPH WILLIAM FAY.
CHARLES WALES.